(12) United States Patent
Xin et al.

(10) Patent No.: US 7,126,973 B2
(45) Date of Patent: Oct. 24, 2006

(54) ONE DIMENSIONAL ALL-METAL SLAB WAVEGUIDE GAS LASER

(75) Inventors: Jianguo Xin, Beijing (CN); Jiangxing Wu, Henan Province (CN); Zhiyuan Zhang, Beijing (CN); Weiping Wang, Guangdong Province (CN)

(73) Assignee: Beijing BDHlaser Science & Technology Inc. Ltd., Beijing (CN)

( * ) Notice: Subject to any disclaimer, the term of this patent is extended or adjusted under 35 U.S.C. 154(b) by 269 days.

(21) Appl. No.: 10/930,574

(22) Filed: Aug. 31, 2004

(65) Prior Publication Data

US 2005/0069008 A1    Mar. 31, 2005

(30) Foreign Application Priority Data

Sep. 29, 2003    (CN) .............................. 03 1 34722

(51) Int. Cl.
  *H01S 3/03* (2006.01)
(52) U.S. Cl. ....................................................... 372/64
(58) Field of Classification Search .................. 372/64
  See application file for complete search history.

(56) References Cited

U.S. PATENT DOCUMENTS 5,412,681 A * 5/1995 Eisel et al. .................... 372/64

FOREIGN PATENT DOCUMENTS

| CN | 1055839 A | 10/1991 |
| CN | 1155775 A | 7/1997 |
| CN | 1252636 A | 5/2000 |
| CN | 1501556 A | 6/2004 |

OTHER PUBLICATIONS

Holmes, "Commercial Gas Lasers All-Metal $CO_2$ Laser Could Open Low-Cost Markets", Circle No. 28, 44-48, Apr. 1988.

Laakmann, "Sealed-off Low-and Medium-power $CO_2$ Lasers", Lasers & Oprtronics 35-41, Mar. 1989.

Xin et al., "RF-excited All-metal Waveguide $CO_2$ Laser", Appl. Phys. Lett. 59:3363-3365, Dec. 1992.

Xin et al., "RF Excited Slab Waveguide Array $CO_2$ Laser With Mutual Injection Phase Coupling", Gas Lasers—Recent Developments and Future Prospects 125-133, 1996.

Xin et al., "Radio Frequency Discharge Excited Diffusively Cooled Kilowatt Carbon Monoxide Slab Waveguide Laser With a Three Mirror Resonator", Applied Physics Letters 75:1369-1370, 1999.

* cited by examiner

*Primary Examiner*—Minsun Oh Harvey
*Assistant Examiner*—Rory Finneren
(74) *Attorney, Agent, or Firm*—Fish & Richardson P.C.

(57) ABSTRACT

A one dimension all-metal slab waveguide gas laser comprises a slab waveguide gas discharge area and an optical resonator disposed in a metal vacuum chamber. The gas discharge area is formed by a top and a bottom metal electrodes and metal supporting blocks insolated with the electrodes. A metal liner plate and a metal press plate are sequentially disposed on upside of the metal electrodes. A metal supporting plate is disposed at underside of the metal electrodes. The metal top electrodes are connected with a supply power through link pins of the metal electrodes. An output mirror and a feedback mirror are respectively arranged at two sides of the optical resonator. An output window of the laser is disposed in the vacuum chamber. The present one dimension waveguide gas laser has advantages of good quality of high thermo conducting and simple processing as well as low cost, and can avoid appearing modulation of the output power of the laser which is caused by high order mode of the guide in current two dimension slab guide laser, thereby the quality of optical beam of the laser is improved.

28 Claims, 5 Drawing Sheets

ONE DIMENSIONAL ALL-METAL SLAB WAVEGUIDE GAS LASER

TECHNICAL FIELD

The present invention relates to waveguide gas laser technology, in particular to a one dimensional all-metal slab waveguide gas laser.

BACKGROUND ART

Figure 1A:
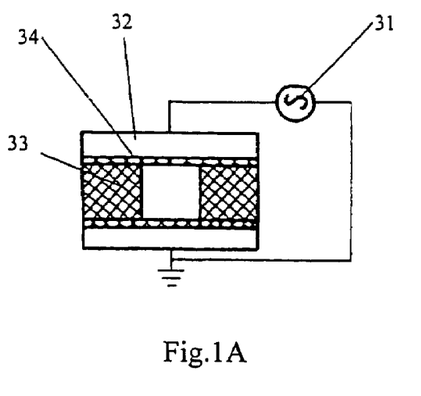
FIG. 1A shows the all-ceramic single channel waveguide structure in a prior gas laser.
Figure 1B:
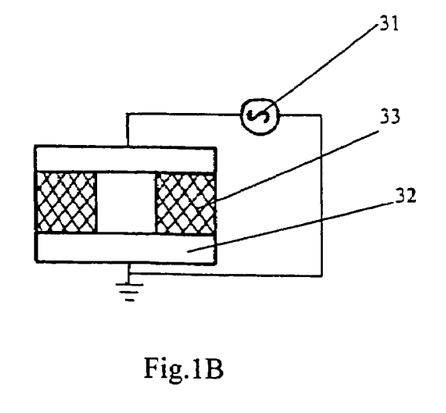
FIG. 1B shows the metal-ceramic sandwich structure in a prior gas laser.
Figure 1C:
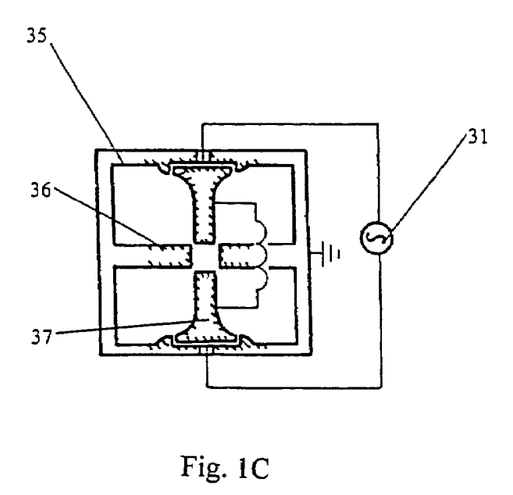
FIG. 1C shows the all-metal four-electrode large aperture channel structure in a prior gas laser.
Figure 1D:
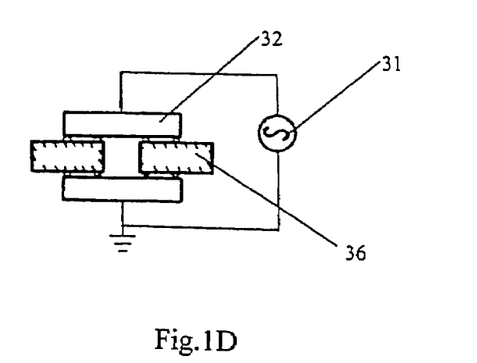
FIG. 1D shows the all-metal square waveguide structure in a prior gas laser.

The combination of RF transverse gas electric discharging technology with optical waveguide technology drives the rapid development of waveguide $CO_2$ laser technology. In the past decade, RF transverse single waveguide $CO_2$ laser technology has experienced a development process from all-ceramic waveguide structures to ceramics and metal sandwich waveguide structures to all-metal waveguide structures. In the all-ceramic waveguide structure (see FIG. 1A), a square waveguide is composed of two vacuum ceramic side walls 33 and two vacuum ceramic clamp plates 34, and disposed between two metal electrodes 32 connected with a high frequency power supply 31. A gain channel area is formed in the waveguide by discharge excitation. The advantage of the all-ceramic waveguide structure is low loss of optical wave. Along with the development of the waveguide $CO_2$ laser technology, in order to enhance gain cooling effect, decrease the cost and simplify the structure, the metal and ceramic sandwich waveguide structure is proposed (see FIG. 1B). In the metal and ceramic waveguide structure, two metal electrodes 32 and two vacuum ceramic side walls 33 form a waveguide discharge excitation channel, the metal electrodes 32 being connected with the high frequency power supply 31. In order to further lower the cost of device and facilitate modularization of production, in 1988 Synrad company of the USA proposed an RF excitation large aperture all-metal channel $CO_2$ laser technology, disclosed on *Laser Focus*, pp 44–48, April 1998 (see FIG. 1C). In the technology, a gas discharge channel is composed of two metal side walls 36 having surface insulation layers and two metal electrodes 37 of having surface insulation layers. The metal side walls 36 having the surface insulation layers are connected with a metal housing 35. The two metal electrodes 37 having surface insulation layers are connected with the high frequency power supply 31. The two metal electrodes 37 have a phase difference of 180 degree, forming a four-electrode discharging mode. In 1991, Mr. Jianguo Xin, et al. from Beijing Institute of Technology developed a two-electrode RF transverse excited all-metal waveguide structure $CO_2$ laser technology, disclosed on *Applied Physics Letters*, Vol. 59(26), p3363, 1991 (see FIG. 1D). In this kind of structure, two metal electrodes 32 and two metal side walls 36 with surface insulation layers form a gas discharge channel of a waveguide. A 0.1 mm thick gas gap exists between the metal side walls 36 with two surface insulation layers and the metal electrodes 32. According to Paschen's law, the gas breakdown voltage in a very small gas gap is relatively high, and the voltage in the air gap is only ½ of the voltage between the two metal electrodes 32. Therefore gas discharge excitation can be limited to within the waveguide channel by appropriately designing the size of waveguide channel.

In present there are only two institutes in the world which are reported to own RF excited all-metal $CO_2$ laser technology: the RF excited four-electrode large aperture all-metal channel $CO_2$ laser from Synrad Company of the USA, and the RF transverse excited two-electrode all-metal waveguide structure $CO_2$ laser.

But by far, all of the area scaling slab waveguide RF excited diffusively cooled $CO_2$ lasers reported home and abroad adopt a metal and ceramic sandwich structure. In a technical point of view, the waveguide RF excited diffusively cooled $CO_2$ laser with the metal and ceramic sandwich structure uses ceramics to electrically separate discharge electrodes so as to generate gas discharge to form a gain area in the waveguide of the metal and ceramic sandwich structure. The process of this kind of metal and ceramic sandwich structure is relatively complex and higher manufacturing cost. On the other hand, the RF excited diffusively cooled $CO_2$ laser with all-metal waveguide structure uses Paschen's law of gas discharge and principle of voltage division 1 to suppress the gas discharge inside the all-metal waveguide to form a gain area. The principle of forming gain area in the two kinds of technologies is different.

All of the prior structures of slab waveguide lasers are of two dimensional waveguide structures. In the prior two dimensional slab waveguide structure, a high order mode effect in the waveguide can be generated in the direction parallel with the electrodes in the waveguide cross section, making the intensity of laser output beam distributed in the direction to be modulated, thereby affecting the beam quality.

CONTENTS OF THE INVENTION

In order to overcome the problems that the prior slab waveguide laser structure is complex and higher manufacturing cost and a high order waveguide mode effect can be generated in the two dimensional slab waveguide structure to affect beam quality, the present invention provides an one dimensional all-metal slab waveguide gas laser.

The one dimensional all-metal slab waveguide gas laser of the present invention comprises a metal vacuum chamber, and a slab waveguide gas discharge region and an optical resonator disposed in the vacuum chamber. The gas discharge region includes a metal top electrode, a metal bottom electrode, at least two metal supporting blocks disposed between the metal top electrode and the metal bottom electrode, and at least two ceramic insulation plates disposed along the electrode length direction between the metal supporting blocks and the metal top electrode and the metal bottom electrodes. The ceramic insulation plates separate the metal top electrode and the metal bottom electrode to form voltage division electric insulation separation; the metal bottom electrode is disposed on a metal bearing plate which is tightly contacted with the inner wall of the lower part of the metal vacuum chamber; on the metal top electrode are disposed sequentially a metal liner plate and a metal press plate, and between the metal liner plate and the metal top electrode and the metal press plate are disposed at least two ceramic insulation plates to form electric insulation there between; the metal press plate is tightly contacted with the inner wall of the upper part of the metal vacuum chamber; the metal top electrode is connected with an electrode link pin, and the electrode link pin passes through a vacuum separation insulation bush to connect with the power supply outside the metal vacuum chamber; the optical resonator comprises an output mirror and a rear feedback mirror disposed at the two ends of the gas discharge region along the electrode length; and on the vacuum chamber is sealed a laser output window.

The present invention is an one dimensional all-metal slab waveguide laser, which is based on Paschen's law of gas discharge and voltage division technology, and adopts RF transverse gas discharge excitation to form a laser gain in an one dimensional metal slab waveguide, forming a one dimensional slab all-metal waveguide gas laser of RF transverse gas discharge excitation. This kind of laser can reduce device cost and form modularized production, compared with ceramic structure waveguide and metal-ceramic sandwich structure waveguide lasers. Since the present invention is an one dimensional slab waveguide laser structure without waveguide side walls, it in principle eliminates the high order waveguide mode effect generated in the direction parallel with electrodes in the waveguide cross section, and makes the laser output beam intensity distributed over that direction without generating a modulation phenomenon, thereby enhancing the laser output beam quality.

MODE OF CARRYING OUT THE INVENTION

The one dimensional all-metal slab waveguide laser of the present invention has some kinds of structures shown in FIG. 2A, FIG. 2B, FIG. 2C, FIG. 3A, FIG. 3B and FIG. 3C. Metal top electrode 1, metal bottom electrode 2 and metal supporting block 3 compose a gas discharge region of the slab waveguide (height H=0.2–8 mm, width W=2–500 mm), i.e., a laser gain area. The metal bottom electrode 2 is disposed on metal bearing plate 4. There is no side wall of the rectangular space formed between metal top electrode 1 and metal bottom electrode 2, a one dimensional slab waveguide along a longitudinal direction of the electrodes is formed. In the waveguide, metal top electrode 1 and metal bottom electrode 2 have a guided-wave effect on an optical wave field perpendicular to the electrode direction, while in the direction parallel with metal top electrode 1 and metal bottom electrode 2, there is no guided-wave effect because there is no side wall boundary, and the optical wave field propagates in a free space mode, thereby the structure of the present invention is a one dimensional waveguide. A slab capacitor C is formed between metal top electrode 1 and metal bottom electrode 2 (see FIG. 4). A plurality of matching inductors 9 disposed in parallel with the slab capacitor C are connected between metal top electrode 1 and metal bearing plate 4, and arranged uniformly along longitudinal direction of the electrodes, so as to change parameter of capacitive reactance of the slab capacities formed between metal top electrode 1 and metal bottom electrode 2, enabling to generate gas discharge more easily by applying high frequency electromagnetic wave between metal top electrode 1 and metal bottom electrode 2. Metal bearing plate 4 is tightly contacted with the inner wall of metal vacuum chamber 12. Metal supporting block 3 is disposed between metal top electrode 1 and metal bearing plate 4, electric insulation separations are formed between metal top electrode 1 and metal supporting block 3, between metal bearing plate 4 and metal supporting block 3 respectively through a plurality of ceramic insulation plates (0.1–6 mm thick) along longitudinal direction of the electrodes (see FIG. 2A).

Figure 2A:
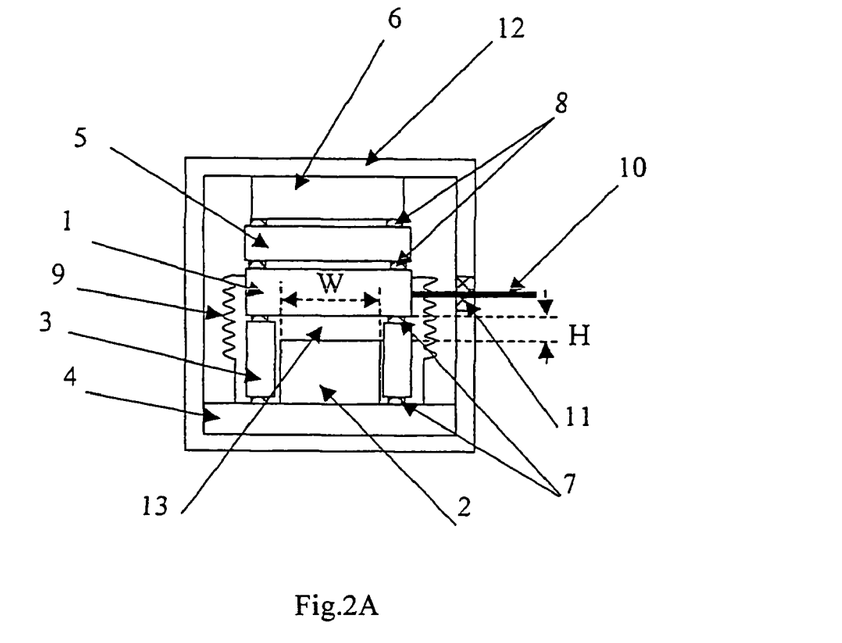
FIG. 2A schematically shows the cross section of a one dimensional all-metal slab waveguide structure according to an embodiment of the present invention.
Figure 2B:
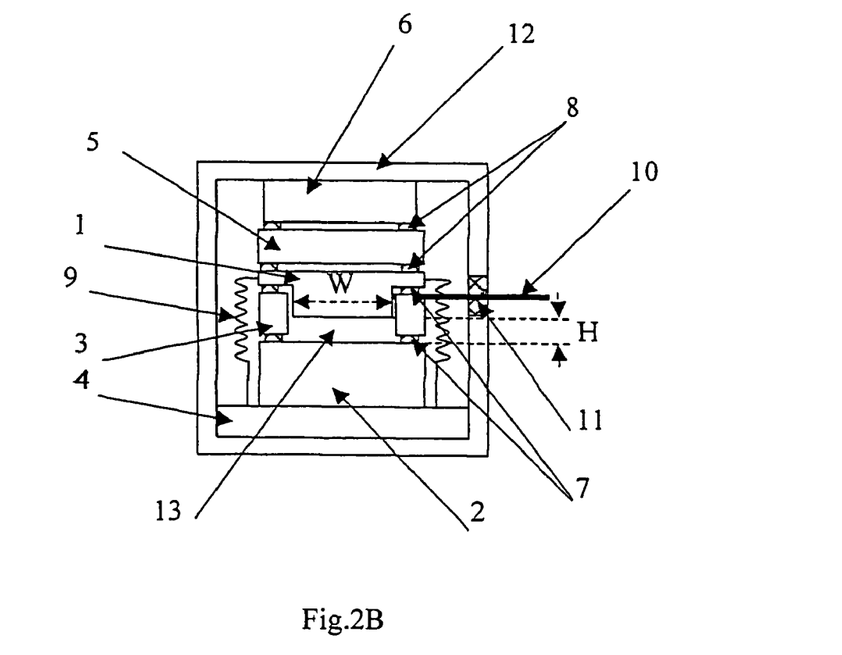
FIG. 2B schematically shows the cross section of a one dimensional all-metal slab waveguide structure according to another embodiment of the present invention.

The slab waveguide of the present invention can also adopt the structure shown in FIG. 2B, that is, metal top electrode 1 is formed to have concave platforms on the two sides and a convex platform in the middle, metal supporting block 3 is disposed between the concave platforms on the two sides of metal top electrode 1 and metal bottom electrode 2, and electric insulation separation between metal top electrode 1 and metal supporting block 3, between metal bottom electrode 2 and metal supporting block 3 are formed through a plurality of ceramic insulation plates 7 (0.1–6 mm thick) along longitudinal direction of the electrode.

Figure 2C:
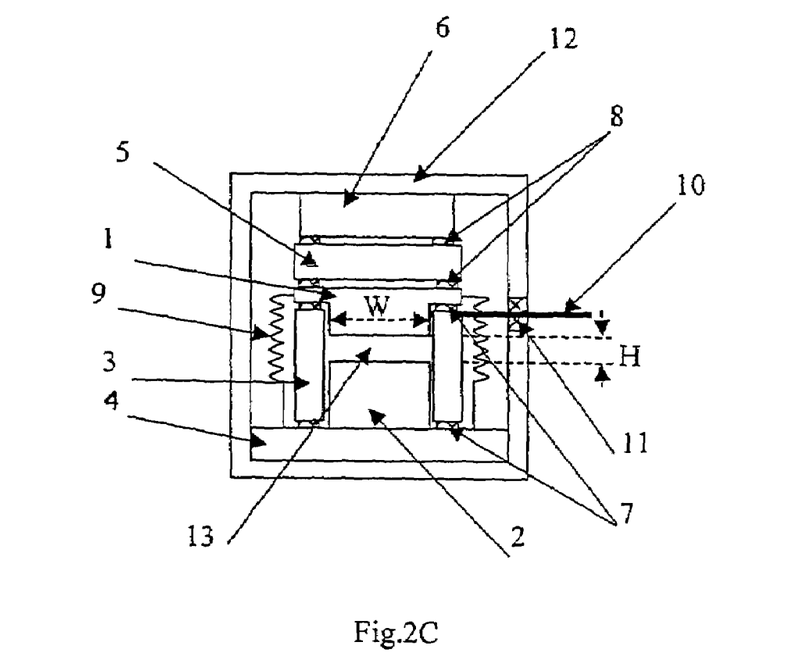
FIG. 2C schematically shows the cross section of a one dimensional all-metal slab waveguide structure according to yet another embodiment of the present invention.

The slab waveguide of the present invention can also adopt the structure shown in FIG. 2C, that is, metal top electrode 1 is formed to have concave platforms on the two sides and a convex platform in the middle, metal supporting block 3 is disposed between the concave platforms on the two sides of metal top electrode 1 and metal bearing plate 4, and electric insulation separation between metal top electrode 1 and metal supporting block 3, between metal bearing plate 4 and metal supporting block 3 are respectively formed through a plurality of ceramic insulation plates 7 (0.1–6 mm thick) along the electrode longitudinal direction.

Figure 4:
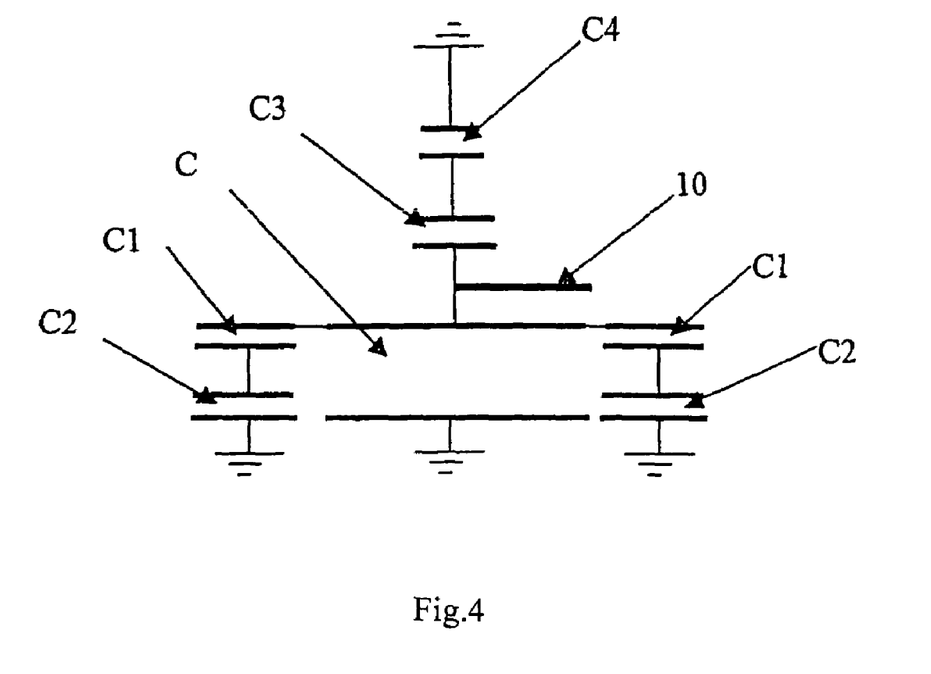
FIG. 4 schematically shows the equivalent circuit of a one dimensional all-metal slab waveguide structure.

Capacitor C1 and C2 are formed in the above-mentioned structure, between metal supporting block 3 and metal top electrode 1, and metal bottom electrode 2 (see FIG. 4). When a high frequency electric field is applied between metal top electrode 1 and metal bottom electrode 2, the sum of the voltages on C1 and C2 is equal to the voltage between metal top electrode 1 and metal bottom electrode 2. Therefore when gas discharge occurs between metal top electrode 1 and metal bottom electrode 2, there will be no gas discharge phenomenon between metal supporting block 3 and metal top electrode 1, and metal bottom electrode 2. The distances between the side of metal supporting block 3 and metal top electrode 1, and metal bottom electrode 2 are 0.2–6 mm. An electric insulation separations are respectively formed between metal liner plate 5 and metal top electrode 1, and metal clamp plate 6 by using a plurality of ceramic insulating plates 8 (0.1–6 mm thick) along longitudinal direction of electrodes, and capacitors C3 and C4 are formed between metal liner plate 5 and metal top electrode 1, and metal clamp plate 6 respectively (see FIG. 4). When a high frequency electric field is applied between metal top electrode 1 and metal bottom electrode 2, the sum of the voltages on capacitors C3 and C4 is equal to the voltage between metal top electrode 1 and metal bottom electrode 2. Therefore, according to Paschen's law and voltage division principle, when gas discharge is generated between metal top electrode 1 and metal bottom electrode 2, there will be no gas discharge phenomenon occurring between metal liner plate 5 and metal top electrode 1, and metal clamp plate 6 respectively. Metal clamp plate 6 is in close contacted with the inner wall of metal vacuum chamber 12. Metal top electrode 1 is connected with electrode link pin 10, and electrode link pin 10 passes through vacuum separation insulation bush 11 to connect with the high frequency power supply outside the metal vacuum chamber 12. An RF electromagnetic power is applied between metal top electrode 1 and metal bottom electrode 2 to form gas discharge excitation, which can form a gain volume of the slab laser combining with an optical resonator, and can obtain an effective laser power output.

Figure 3A:
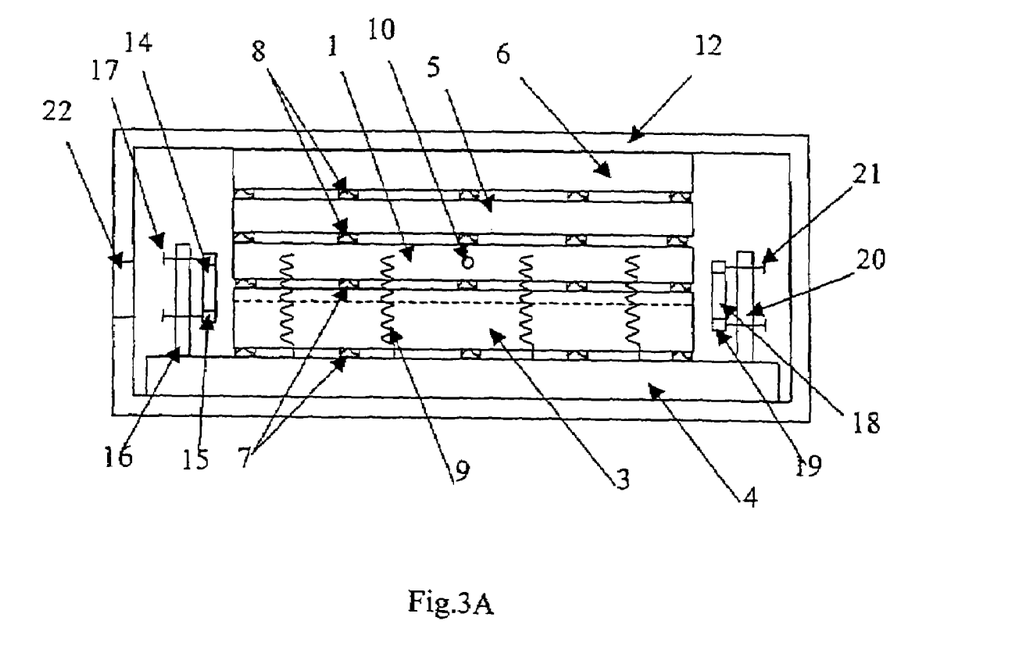
FIG. 3A schematically shows the longitudinal section of the one dimensional all-metal slab waveguide structure of the present invention shown in FIG. 2A.
Figure 3B:
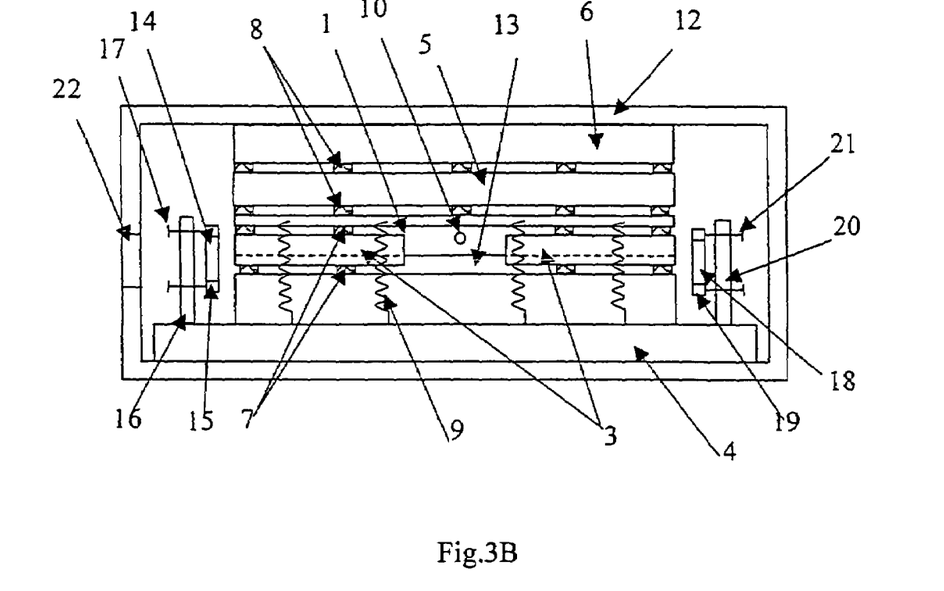
FIG. 3B schematically shows the longitudinal section of the one dimensional all-metal slab waveguide structure of the present invention shown in FIG. 2B.
Figure 3C:
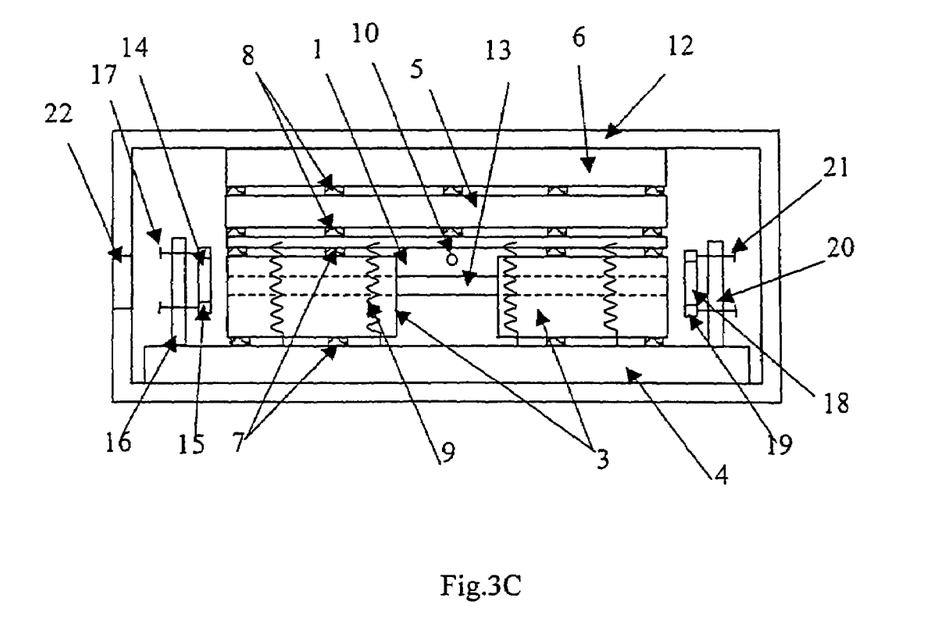
FIG. 3C schematically shows the longitudinal section of the one dimensional all-metal slab waveguide structure of the present invention shown in FIG. 2C.

The output mirror 14 of the optical resonator is mounted inside metal holding frame 15 for output mirror. Metal holding frame 15 of the output mirror is connected with metal supporting bracket 16 which is for adjusting the output mirror holding frame 15 through metal adjusting screw 17. Metal supporting bracket 16 for adjusting the output mirror holding frame is disposed on metal bearing plate 4 (as shown in FIG. 3). Rear feedback mirror 18 of the optical resonator is fixed in metal holding frame 19 for the rear feedback mirror. Metal holding frame 19 for rear feedback mirror is connected with metal supporting bracket 20 which is for adjusting the rear feedback mirror holding frame 19 through metal adjusting screw 21. Metal supporting bracket 20 for adjusting the rear feedback mirror holding frame 19 is disposed on metal bearing plate 4. Laser output window 22 is vacuum sealed on the front-end panel of vacuum chamber 12 (as shown in FIG. 3).

The following gives out a specific embodiment of the present invention.

Metal top electrode 1, metal bottom electrode 2, metal supporting block 3, metal bearing plate 4, metal liner plate 5, metal press plate 6, metal frame 15 for holding output mirror 14, metal frame 19 for holding rear feedback mirror 18, metal screw 17 for adjusting the output mirror holding frame 15, and metal screw 21 for adjusting the rear feedback mirror holding frame 19 are all made of stainless aluminum alloy. Ceramic insulation washers 7 and 8 are made of $Al_2O_3$ vacuum ceramics. Electrode link pin 10 and matching inductor 9 are made of metal copper. Metal vacuum chamber 12 is made of forged aluminum alloy. Metal screw 16 for adjusting the output mirror holding frame and metal screw 20 for adjusting the rear feedback mirror holding frame are made of copper alloy.

Metal top electrode 1 has a length L1 of 386 mm, a width W1 of 40 mm and a height H1 of 20 mm. Metal bottom electrode 2 has a length L2 of 386 mm, a width W2 of 20 mm and a height H2 of 18 mm. Metal supporting block 3 has a length L3 of 386 mm, a width W3 of 9 mm and a height H3 of 20 mm. Metal bearing plate 4 has a length L4 of 486 mm, a width W4 of 80 mm and a height H4 of 19.6 mm. Metal liner plate 5 has a length L5 of 386 mm, a width W5 of 30 mm and a height H5 of 15 mm. Metal press plate 6 has a length L6 of 386 mm, a width W6 of 30 mm and a height H6 of 15 mm. Ceramic insulation washers 7 and 8 each is a circular washer with a diameter of 8 mm and a thickness of 0.1 mm. Matching inductor 9 includes 8 spiral coil inductors each of those has 4 circles with external diameter of 10 mm and interval of 2 mm there between, the circle is composed by winding copper wires of 1 mm diameter The spiral coil inductor 9 is arranged uniformly along longitudinal direction of the electrodes between metal top electrode 1 and metal bearing plate 4. Metal vacuum chamber 12 has a length of 500 mm, an outer width W7 of 110 mm, an outer height H7 of 110 mm, an inner width W8 of 90 mm and an inner height H8 of 90 mm.

Figure 5:
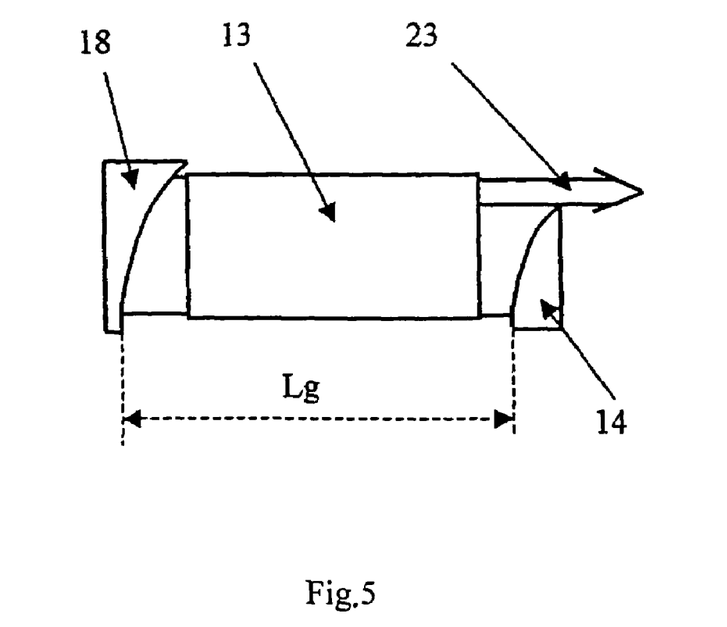
FIG. 5 schematically shows the combination of slab gain area and off-axis unstable virtial confocal cavity.

The optical resonator is an off-axis virtual confocal unstable cavity. Output mirror 14 of the optical resonator is an off-axis convex mirror with a radius of curvature r of 3280 mm. Rear feedback mirror 18 of the optical resonator is an off-axis concave mirror with a radius of curvature r of 4100 mm. The length Lg of the optical resonator cavity is 410 mm (see FIG. 5).

The assembly composed of metal top electrode 1, metal bottom electrode 2 metal supporting block 3, metal bearing plate 4, metal liner plate 5, metal press plate 6, ceramic insulation washers 7 and 8, matching inductor 9, and electrode link pin 10 is fixed in metal vacuum chamber 12, so as to form a gas discharge region 13 with a height H of 2 mm and a width W of 20 mm of the one dimensional all-metal slab waveguide, (see FIGS. 2 and 3).

By inputting RF power through electrode link pin 10 to generate RF gas discharge excitation in the gas discharge region 13 of the one dimensional all-metal slab waveguide, a gain volume of the slab laser can be formed, and by combining with the optical resonator (see FIG. 5), an effective laser power output 23 can be obtained.

In the structure of the present invention, because a one dimensional slab waveguide is an all-metal slab waveguide, it possesses the advantages of excellent thermoconductance and low cost. When adopting the metal materials such as aluminum alloy, the parts and components of the waveguide can be made by the process of extrusion, thereby the modularization production of the waveguide and further reduction of cost can be achieved. Compared with the prior all-ceramic waveguide structure laser or the metal and ceramic sandwich waveguide laser, the present invention possesses a relatively great advantage of low cost. Compared with the prior all-metal waveguide structure laser, it has a simpler structure and its thermoconductance can be further enhanced. In addition, because it is of a one dimensional slab waveguide structure without any waveguide side walls, the high order waveguide mode effect generated in the direction parallel with electrodes in the waveguide cross section is eliminated, making the intensity of laser output beam distributed over the direction not be modulated, and thereby enhancing the laser output beam quality.

The invention claimed is:

1. A one dimensional all-metal slab waveguide gas laser, comprising a metal vacuum chamber, and a slab waveguide gas discharge region and an optical resonator disposed in the vacuum chamber, characterized in that:

a vacuum chamber, and a slab waveguide gas discharge region and a optical resonator disposed in the vacuum chamber, the gas discharge region includes a metal top electrode, a metal bottom electrode, at least two metal supporting blocks disposed between the metal top electrode and the metal bottom electrode, and at least two ceramic insulation plates disposed along the electrode length direction between the metal supporting blocks and the metal top electrode and the metal bottom electrodes, the ceramic insulation plates separate the metal top electrode and the metal bottom electrode to form voltage division electric insulation separation; the metal bottom electrode is disposed on a metal bearing plate which is tightly contacted with the inner wall of the lower part of the metal vacuum chamber; on the metal top electrode are disposed sequentially a metal liner plate and a metal press plate, and between the metal liner plate and the metal top electrode and the metal press plate are disposed at least two ceramic insulation plates to form electric insulation there between; the metal press plate is tightly contacted with the inner wall of the upper part of the metal vacuum chamber; the metal top electrode is connected with an electrode link pin, and the electrode link pin passes through a vacuum separation insulation bush to connect with the power supply outside the metal vacuum chamber; the optical resonator comprises an output mirror and a rear feedback mirror disposed at the two ends of the gas discharge region along the electrode length; and on the vacuum chamber is sealed a laser output window.

2. The one dimensional all-metal slab waveguide gas laser according to claim 1, wherein the lower end of the metal supporting block is disposed on the metal bearing plate through the separation of the ceramic insulation plates.

3. The one dimensional all-metal slab waveguide gas laser according to claim 1, wherein at least two inductors are connected between the metal top electrode and the metal bearing plate.

4. The one dimensional all-metal slab waveguide gas laser according to claim 2, wherein at least two inductors are connected between the metal top electrode and the metal bearing plate.

5. The one dimensional all-metal slab waveguide gas laser according to claim 1, wherein an output mirror of the optical resonator is fixed in a metal holding frame of the output mirror, the metal holding frame of the output mirror is connected with a metal supporting bracket for adjusting the output mirror holding frame through metal adjusting screws, the metal supporting bracket for adjusting the output mirror holding frame is fixed on the metal bearing plate, the rear feedback mirror of the optical resonator is fixed in a metal holding frame for the rear feedback mirror, the metal holding frame for the rear feedback mirror is connected with a metal supporting bracket for adjusting the rear feedback mirror holding frame through metal adjusting screws, and the metal supporting bracket for adjusting the rear feedback mirror holding frame is fixed on the metal bearing plate.

6. The one dimensional all-metal slab waveguide gas laser according to claim 1, wherein the laser gain area has a height H of 0.2–8 mm; a width W of 2–500 mm; the distance between the side of the metal supporting block and the metal top electrode or the metal bottom electrode is 0.1–6 mm; the ceramic insulation plates each has a thickness of 0.1–6 mm.

7. The one dimensional all-metal slab waveguide gas laser according to claim 5, wherein the laser gain area has a height H of 0.2–8 mm; a width W of 2–500 mm; the distance between the side of the metal supporting block and the metal top electrode or the metal bottom electrode is 0.1–6 mm; the ceramic insulation plates each has a thickness of 0.1–6 mm.

8. The one dimensional all-metal slab waveguide gas laser according to claim 1, wherein the metal bottom electrode and the metal bearing plate are formed into an integrated component.

9. The one dimensional all-metal slab waveguide gas laser according to claim 1, wherein the metal top electrode is formed in shape of concave platforms at two sides thereof, and of downward convex platform in the middle thereof, and the upper end of the metal supporting block is in contact with the concave platforms of two sides of the metal top electrode through separation of the ceramic insulation plates.

10. The one dimensional all-metal slab waveguide gas laser according to claim 5, wherein the metal top electrode is formed in shape of concave platforms at two sides thereof, and of downward convex platform in the middle thereof, and the upper end of the metal supporting block is in contact with the concave platforms of two sides of the metal top electrode through separation of the ceramic insulation plates.

11. The one dimensional all-metal slab waveguide gas laser according to claim 2, wherein an output mirror of the optical resonator is fixed in a metal holding frame of the output mirror, the metal holding frame of the output mirror is connected with a metal supporting bracket for adjusting the output mirror holding frame through metal adjusting screws, the metal supporting bracket for adjusting the output mirror holding frame is fixed on the metal bearing plate, the rear feedback mirror of the optical resonator is fixed in a metal holding frame for the rear feedback mirror, the metal holding frame for the rear feedback mirror is connected with a metal supporting bracket for adjusting the rear feedback mirror holding frame through metal adjusting screws, and the metal supporting bracket for adjusting the rear feedback mirror holding frame is fixed on the metal bearing plate.

12. The one dimensional all-metal slab waveguide gas laser according to claim 3, wherein an output mirror of the optical resonator is fixed in a metal holding frame of the output mirror, the metal holding frame of the output mirror is connected with a metal supporting bracket for adjusting the output mirror holding frame through metal adjusting screws, the metal supporting bracket for adjusting the output mirror holding frame is fixed on the metal bearing plate, the rear feedback mirror of the optical resonator is fixed in a metal holding frame for the rear feedback mirror, the metal holding frame for the rear feedback mirror is connected with a metal supporting bracket for adjusting the rear feedback mirror holding frame through metal adjusting screws, and the metal supporting bracket for adjusting the rear feedback mirror holding frame is fixed on the metal bearing plate.

13. The one dimensional all-metal slab waveguide gas laser according to claim 4, wherein an output mirror of the optical resonator is fixed in a metal holding frame of the output mirror, the metal holding frame of the output mirror is connected with a metal supporting bracket for adjusting the output mirror holding frame through metal adjusting screws, the metal supporting bracket for adjusting the output mirror holding frame is fixed on the metal bearing plate, the rear feedback mirror of the optical resonator is fixed in a metal holding frame for the rear feedback mirror, the metal holding frame for the rear feedback mirror is connected with a metal supporting bracket for adjusting the rear feedback mirror holding frame through metal adjusting screws, and the metal supporting bracket for adjusting the rear feedback mirror holding frame is fixed on the metal bearing plate.

14. The one dimensional all-metal slab waveguide gas laser according to claim 2, wherein the laser gain area has a height H of 0.2–8 mm; a width W of 2–500 mm; the distance between the side of the metal supporting block and the metal top electrode or the metal bottom electrode is 0.1–6 mm; the ceramic insulation plates each has a thickness of 0.1–6 mm.

15. The one dimensional all-metal slab waveguide gas laser according to claim 3, wherein the laser gain area has a height H of 0.2–8 mm; a width W of 2–500 mm; the distance between the side of the metal supporting block and the metal top electrode or the metal bottom electrode is 0.1–6 mm; the ceramic insulation plates each has a thickness of 0.1–6 mm.

16. The one dimensional all-metal slab waveguide gas laser according to claim 4, wherein the laser gain area has a height H of 0.2–8 mm; a width W of 2–500 mm; the distance between the side of the metal supporting block and the metal top electrode or the metal bottom electrode is 0.1–6 mm; the ceramic insulation plates each has a thickness of 0.1–6 mm.

17. The one dimensional all-metal slab waveguide gas laser according to claim 11, wherein the laser gain area has a height H of 0.2–8 mm; a width W of 2–500 mm; the distance between the side of the metal supporting block and the metal top electrode or the metal bottom electrode is 0.1–6 mm; the ceramic insulation plates each has a thickness of 0.1–6 mm.

18. The one dimensional all-metal slab waveguide gas laser according to claim 12, wherein the laser gain area has a height H of 0.2–8 mm; a width W of 2–500 mm; the distance between the side of the metal supporting block and the metal top electrode or the metal bottom electrode is 0.1–6 mm; the ceramic insulation plates each has a thickness of 0.1–6 mm.

19. The one dimensional all-metal slab waveguide gas laser according to claim 13, wherein the laser gain area has a height H of 0.2–8 mm; a width W of 2–500 mm; the distance between the side of the metal supporting block and the metal top electrode or the metal bottom electrode is 0.1–6 mm; the ceramic insulation plates each has a thickness of 0.1–6 mm.

20. The one dimensional all-metal slab waveguide gas laser according to claim 2, wherein the metal bottom electrode and the metal bearing plate are formed into an integrated component.

21. The one dimensional all-metal slab waveguide gas laser according to claim 3, wherein the metal bottom electrode and the metal bearing plate are formed into an integrated component.

22. The one dimensional all-metal slab waveguide gas laser according to claim 4, wherein the metal bottom electrode and the metal bearing plate are formed into an integrated component.

23. The one dimensional all-metal slab waveguide gas laser according to claim 2, wherein the metal top electrode is formed in shape of concave platforms at two sides thereof, and of downward convex platform in the middle thereof, and the upper end of the metal supporting block is in contact with the concave platforms of two sides of the metal top electrode through separation of the ceramic insulation plates.

24. The one dimensional all-metal slab waveguide gas laser according to claim 3, wherein the metal top electrode is formed in shape of concave platforms at two sides thereof, and of downward convex platform in the middle thereof, and the upper end of the metal supporting block is in contact with the concave platforms of two sides of the metal top electrode through separation of the ceramic insulation plates.

25. The one dimensional all-metal slab waveguide gas laser according to claim 4, wherein the metal top electrode is formed in shape of concave platforms at two sides thereof, and of downward convex platform in the middle thereof, and the upper end of the metal supporting block is in contact with the concave platforms of two sides of the metal top electrode through separation of the ceramic insulation plates.

26. The one dimensional all-metal slab waveguide gas laser according to claim 11, wherein the metal top electrode is formed in shape of concave platforms at two sides thereof, and of downward convex platform in the middle thereof, and the upper end of the metal supporting block is in contact with the concave platforms of two sides of the metal top electrode through separation of the ceramic insulation plates.

27. The one dimensional all-metal slab waveguide gas laser according to claim 12, wherein the metal top electrode is formed in shape of concave platforms at two sides thereof, and of downward convex platform in the middle thereof, and the upper end of the metal supporting block is in contact with the concave platforms of two sides of the metal top electrode through separation of the ceramic insulation plates.

28. The one dimensional all-metal slab waveguide gas laser according to claim 13, wherein the metal top electrode is formed in shape of concave platforms at two sides thereof, and of downward convex platform in the middle thereof, and the upper end of the metal supporting block is in contact with the concave platforms of two sides of the metal top electrode through separation of the ceramic insulation plates.

* * * * *